(12) United States Patent
George et al.

(10) Patent No.: US 10,057,859 B2
(45) Date of Patent: Aug. 21, 2018

(54) SYNCHRONIZED NETWORK FOR BATTERY BACKUP

(71) Applicant: Digi International Inc., Minnetonka, MN (US)

(72) Inventors: Jay Douglas George, Orem, UT (US); John P. Filoso, Pleasant Grove, UT (US)

(73) Assignee: Digi International Inc., Minnetonka, MN (US)

( * ) Notice: Subject to any disclaimer, the term of this patent is extended or adjusted under 35 U.S.C. 154(b) by 621 days.

(21) Appl. No.: 13/670,141

(22) Filed: Nov. 6, 2012

(65) Prior Publication Data

US 2014/0126392 A1 May 8, 2014

(51) Int. Cl.
*H04W 52/02* (2009.01)

(52) U.S. Cl.
CPC ... *H04W 52/0296* (2013.01); *H04W 52/0203* (2013.01); *H04W 52/02* (2013.01); *Y02D 70/00* (2018.01); *Y02D 70/142* (2018.01); *Y02D 70/144* (2018.01); *Y02D 70/146* (2018.01); *Y02D 70/164* (2018.01); *Y02D 70/166* (2018.01); *Y02D 70/22* (2018.01)

(58) Field of Classification Search
CPC ............. H04W 52/02; H04W 52/0209; H04W 52/0203; H04W 52/0296; Y02B 60/50; Y02D 70/00; Y02D 70/142; Y02D 70/146; Y02D 70/22; Y02D 70/144; Y02D 70/164; Y02D 70/166
USPC ....... 370/311, 388, 328, 329, 350, 252, 503, 370/235, 236, 324; 340/575, 10.34, 652, 340/3.2, 636.1; 455/574, 343.4, 127.5, 455/208, 265, 502; 709/223
See application file for complete search history.

(56) References Cited

U.S. PATENT DOCUMENTS

| 5,809,220 A | 9/1998 | Morrison et al. |
| 6,732,189 B1 | 5/2004 | Novaes |
| 6,751,248 B1 | 6/2004 | Tan et al. |

(Continued)

FOREIGN PATENT DOCUMENTS

| EP | 1458141 | 9/2004 |
| EP | 1465362 | 10/2004 |

(Continued)

OTHER PUBLICATIONS

"U.S. Appl. No. 12/429,326 Non Final Office Action dated Dec. 7, 2011", 27 pgs.

(Continued)

*Primary Examiner* — Michael Thier
*Assistant Examiner* — Rownak Islam
(74) *Attorney, Agent, or Firm* — Fogg & Powers LLC

(57) ABSTRACT

Devices, systems, and techniques for a synchronized network for battery backup are described herein. A network device can establish a synchronized sleep schedule with the network while in a mains-power mode of operation. The network device can transmit data in the mains-power mode without regard for a transmission window of the synchronized sleep schedule. The network device can detect an interruption of mains power to itself and transition to a low-power mode of operation. The network device can then transmit data in the low-power mode, restricting data transmission to the transmission window of the synchronized sleep schedule.

31 Claims, 3 Drawing Sheets

(56) References Cited

U.S. PATENT DOCUMENTS

| | | | |
|---|---|---|---|
| 7,461,130 | B1 | 12/2008 | Abdelaziz et al. |
| 7,912,033 | B2* | 3/2011 | Heidari-Bateni . H04W 52/0216 370/311 |
| 7,978,717 | B2* | 7/2011 | Banks ............... H04W 52/0235 370/311 |
| 8,532,072 | B2 | 9/2013 | Byard et al. |
| 8,593,991 | B2 | 11/2013 | Byard et al. |
| 2001/0012757 | A1 | 8/2001 | Boyle |
| 2002/0067736 | A1 | 6/2002 | Garcia-Luna-Aceves et al. |
| 2003/0088620 | A1 | 5/2003 | Kermarrec et al. |
| 2004/0174829 | A1 | 9/2004 | Ayyagari |
| 2004/0192284 | A1 | 9/2004 | Vaisanen et al. |
| 2005/0135302 | A1* | 6/2005 | Wang et al. .................. 370/329 |
| 2005/0174950 | A1 | 8/2005 | Ayyagari |
| 2005/0201301 | A1 | 9/2005 | Bridgelall |
| 2006/0014536 | A1 | 1/2006 | Demirhan et al. |
| 2006/0205373 | A1 | 9/2006 | Lu |
| 2006/0270437 | A1* | 11/2006 | Ueda ................ H04W 52/0216 455/522 |
| 2006/0274764 | A1* | 12/2006 | Mah ......................... G06F 1/30 370/401 |
| 2007/0127421 | A1 | 6/2007 | D'Amico et al. |
| 2008/0137555 | A1* | 6/2008 | Mahesh ............... H04W 84/20 370/254 |
| 2008/0140921 | A1* | 6/2008 | Sutardja ............... G06F 3/0611 711/103 |
| 2009/0274082 | A1* | 11/2009 | Wentink ........................ 370/311 |
| 2010/0067422 | A1* | 3/2010 | Kadous et al. ............... 370/311 |
| 2010/0097969 | A1* | 4/2010 | De Kimpe ........ H04W 52/0216 370/311 |
| 2010/0098102 | A1 | 4/2010 | Banks et al. |
| 2010/0254293 | A1* | 10/2010 | Son et al. ...................... 370/311 |
| 2010/0271993 | A1 | 10/2010 | Byard et al. |
| 2010/0272094 | A1 | 10/2010 | Byard et al. |
| 2012/0287835 | A1* | 11/2012 | Jeon .................... H04W 52/287 370/311 |
| 2013/0006435 | A1* | 1/2013 | Berrios ...................... F24J 2/38 700/295 |
| 2013/0138792 | A1* | 5/2013 | Preden ............. H04W 52/0216 709/223 |
| 2013/0259034 | A1* | 10/2013 | Klein ............... H04W 52/0219 370/389 |

FOREIGN PATENT DOCUMENTS

| | | |
|---|---|---|
| EP | 1487155 | 12/2004 |
| WO | 2008116196 | 9/2008 |

OTHER PUBLICATIONS

"U.S. Appl. No. 12/429,326, Advisory Action dated Oct. 5, 2012", 8 pgs.

"U.S. Appl. No. 12/429,326, Final Office Action dated Jul. 19, 2012", 22 pgs.

"U.S. Appl. No. 12/429,326, Response filed Jun. 7, 2012 to Non Final Office Action dated Dec. 7, 2011", 11 pgs.

"U.S. Appl. No. 12/429,326, Response filed Sep. 19, 2012 to Final Office Action dated Jul. 19, 2012", 14 pgs.

"U.S. Appl. No. 12/429,326, Response filed Oct. 19, 2012 to Final Office Action dated Jul. 19, 2012", 14 pgs.

"U.S. Appl. No. 12/429,358, Final Office Action dated Aug. 6, 2012", 27 pgs.

"U.S. Appl. No. 12/429,358, Non Final Office Action dated Jan. 17, 2012", 39 pgs.

"U.S. Appl. No. 12/429,358, Response filed May 17, 2012 to Non Final Office Action dated May 17, 2012", 12 pgs.

Aguayo, Daniel, et al., "Link-level Measurements from an 802.11b Mesh Network", SIGCOMM '04, Aug. 30-Sep. 3, 2004, Portland, Oregon, (2004), 11 pp.

Kim, Kyu-Han, et al., "On Accurate Measurement of Link Quality in Multi-hop Wireless Mesh Networks", MobiCom '06, Sep. 23-26, 2006, Los Angeles, California, (2006), 38-49.

European Patent Office, "European Search Report from EP Application No. 10160960.0 dated Apr. 16, 2013", "from Foreign Counterpart of U.S. Appl. No. 12/429,358", dated Apr. 16, 2013, pp. 1-9, Published in: EP.

U.S. Patent and Trademark Office, "Final Office Action", "from U.S. Appl. No. 12/429,358", dated Aug. 6, 2012, pp. 1-28, Published in: US.

U.S. Patent and Trademark Office, "Notice of Allowance", "from U.S. Appl. No. 12/429,358", dated Jun. 25, 2013, pp. 1-13, Published in: US.

U.S. Patent and Trademark Office, "Office Action", "from U.S. Appl. No. 12/429,358", dated Jan. 17, 2012, pp. 1-39, Published in: US.

European Patent Office, "European Search Report from EP Application No. 10160957.6 dated Apr. 16, 2013", "from Foreign Counterpart of U.S. Appl. No. 12/429,326", dated Apr. 16, 2013, pp. 1-8, Published in: EP.

U.S. Patent and Trademark Office, "Advisory Action", "from U.S. Appl. No. 12/429,326", dated Oct. 5, 2012, pp. 1-8, Published in: US.

U.S. Patent and Trademark Office, "Final Office Action", "from U.S. Appl. No. 12/429,326", dated Jul. 19, 2012, pp. 1-23, Published in: US.

U.S. Patent and Trademark Office, "Notice of Allowance", "from U.S. Appl. No. 12/429,326", dated May 10, 2013, pp. 1-16, Published in: US.

U.S. Patent and Trademark Office, "Corrected Notice of Allowability", "from U.S. Appl. No. 12/429,326", dated May 31, 2013, pp. 1-6, Published in: US.

U.S. Patent and Trademark Office, "Office Action", "from U.S. Appl. No. 12/429,326", dated Dec. 7, 2011, pp. 1-27, Published in: US.

Aguayo et al., "Link-Level Measurements from an 802.11b Mesh Network", "SIGCOMM '04", Aug. 30-Sep. 3, 2004, pp. 1-11.

Kim et al., "On Accurate Measurement of Link Quality in Multi-hop Wireless Mesh Networks", "MobiCom '06", Sep. 23-26, 2006, pp. 38-49.

\* cited by examiner

SYNCHRONIZED NETWORK FOR BATTERY BACKUP

BACKGROUND

Wirelessly connected networks of devices can be useful for many applications including industrial monitoring and automation. These nodes can be mains powered. At times, however, mains power can fail. Some of these nodes can include battery backup in an attempt to bridge such power failures. Generally, battery backup capacity is scaled to meet the power needs of a node while mains power is unavailable.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
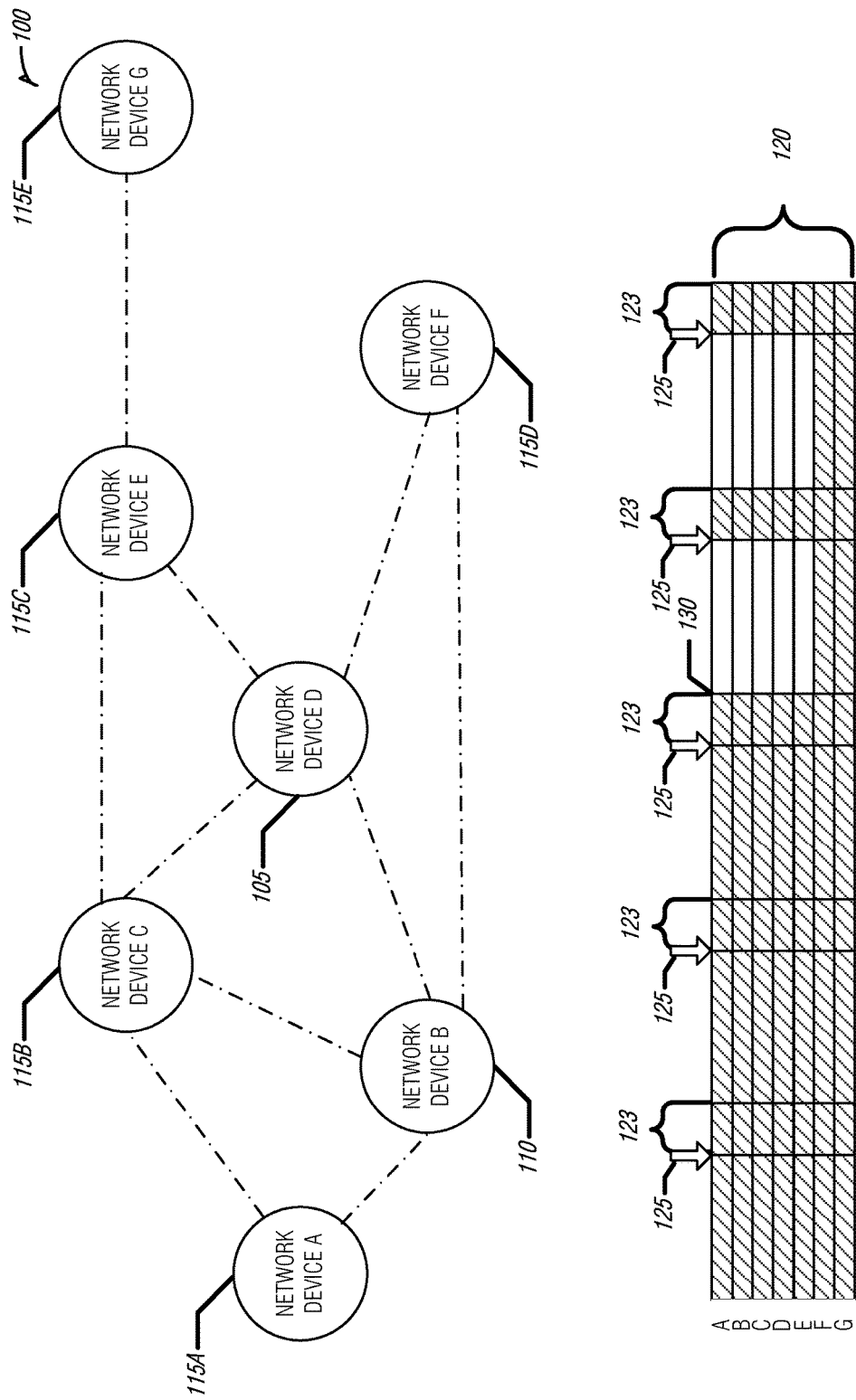
FIG. 1 illustrates an example of a system of a synchronized network for battery backup, according to an embodiment.

Using backup batteries for network devices can present a number of challenges. For example, batteries can be expensive, increasing unit cost. Also, as battery capacity is increased, there is generally a greater imposition of volume and weight upon the design of the network device. Further, battery capacity is limited, resulting in smaller capacity batteries possibly requiring greater (e.g., more frequent) service time, and thus expense, by an operator. Given these considerations, a small inexpensive battery system is desired while reducing servicing costs to an operator of the network device. These objectives may be achieved by reducing the power consumption of the network device when mains power is no longer available. In some examples, other low-power sources, such as photovoltaic devices, may be employed. However, these systems generally provide less power than mains power and thus benefit from reduced power consumption as well.

Network device power consumption can be reduced by placing the network device into a low-power state. In an example, this low-power state may be limited to the transmission or receipt of data to prevent interruption of the network device's monitoring or control functions. In an example, a sleep coordinator node in the network can assign an active interval in which a given network device will be available to transmit data or be receptive to receive data. In example networks where individual network devices have individualized sleep schedules, network operation may entail buffering data to be transferred to or through a sleeping node. Buffering data in this manner may increase network component costs due to the added memory used for the buffering. This burden may be exacerbated in a decentralized mesh network as each device may need to include this increased memory.

An efficient solution to the previously discussed difficulties is a synchronized network for battery backup. When mains power is present, the power requirements of the network device are less important than the network's performance characteristics. Thus, the network device can transmit during any period in order to achieve high speed or lower latency in data transmissions. However, when mains power is unavailable the network device will use its battery backup. Under these circumstances, the network device can operate according to the synchronized network to reduce power needs and thus extend limit battery reserves. In this way, network performance is balanced with network device power needs given available power sources.

An example implementation of the synchronized network for battery backup can include establishing and maintaining a synchronized sleep schedule. The synchronized sleep schedule can be formulated and distributed within the network without regard to whether mains power is available to one or more network devices in the network. The synchronized sleep schedule can include a transmission window in which the network device is expected to transmit data. Thus, when mains power is not available, the network device has a reduced duty cycle and requires less power. Accordingly, smaller battery reserves, or less frequent battery tending, is achieved. When mains power is available (e.g., reestablished) to the network device, the network device can transmit during any period without regard to the transmission window in order to achieve greater speed and lower latency in data transmissions. By using a synchronized transmission window, network components (e.g., other network devices) will be aware of when data can be transmitted to the network device and expect, if necessary, for the network device to pass that data along towards its final destination. Thus, additional memory burdens to buffer network transmission data can be avoided. By reducing power needs, an operator can save costs by using smaller battery reserves and tending to the batteries less frequently. Additionally, unit costs can be reduced by avoiding unnecessary data buffering. Accordingly, the synchronized network for battery backup can balance network performance while reducing costs.

FIG. 1 illustrates an example of a system 100 of a synchronized network for battery backup. In an example, the system 100 is a synchronized network with synchronized sleep. Example implementation details of networks with synchronized sleep are described in U.S. patent application Ser. No. 12/429,358, titled "METHOD FOR SYNCHRONIZING SLEEPING NODES IN A WIRELESS NETWORK", filed Apr. 24, 2009, and U.S. patent application Ser. No. 12/429,326, titled "SYSTEM AND METHOD FOR ADAPTIVELY SETTING THE PROBABILITY OF GENERATING A BEACON BROADCAST IN A WIRELESS NETWORK", filed Apr. 24, 2009, both of which are herein incorporated by reference in their entirety.

The system 100 can include a plurality of network devices including network device 105, network device 110, and network devices 115A-E. The system 100 can also include a synchronized sleep schedule 120. In an example, the network devices 105-115E can be configured in a mesh network. In an example, one or more network devices 105-115E can be wireless.

The synchronized sleep schedule 120 illustrates network device 105-115E transmission behavior. Each row corresponds to a given network device (e.g., the first row 'A' corresponds to the network device A 115A). Shading within a row indicates a time period in which a given network device can transmit. The synchronized sleep schedule 120 includes a repeating transmission window 123 (e.g., an awake window). As illustrated, a synchronization message 125 is received at each of the network devices 105-115E at the beginning of the transmission window 123. In an example, the synchronization message 125 can be received at any time during the transmission window 123. In an example, the synchronization message 125 can be received at any time. In an example, the synchronization message 125 can include the synchronized sleep schedule 120. In an example, the synchronized sleep schedule 120 can include a single set of transmission windows 123 for every network device 105-115E (e.g., every network node) in the network.

The following examples refer to the presence or absence of mains power from the network device 105. As illustrated, mains power is lost to the network device D 105 at period 130. That is, to the left of the period 130, the network device D 105 has the benefit of mains power and to the right of period 130 the network device D 105 is operating on battery backup. As illustrated in FIG. 1, mesh network data traffic can originate at a first node, such as network device A 115A, and pass through other network devices (e.g., the network device D 105) on its way to its destination (e.g., network device G 115E). The network device D 105 can be configured to maintain the synchronized sleep schedule 120 without regard to a current power mode (e.g., mains-power or low-power) of itself. The network device D 105 can also be configured to restrict data transmission (e.g., to the network devices 110 and 115B-C) to the transmission window 123 when in low-power mode. This behavior is illustrated by the absence of shading in the 'D' row to the right of period 130. In an example, the network device D 105 is configured to notify the network when transitioning to low-power mode.

In an example, the network device B 110, which is configured to transmit data to the network device D 105, is configured to transition into its low-power mode in response to a message based on the notification from the network device D 105. In an example, the network device B 110 may be configured to observe low-power mode transmission requirements to the network device D 105 (e.g., observing the transmission window 123 with respect to network device D105) while not itself transitioning to the low-power mode. In this way, the network device B 110 can be assured that it will not transmit data to the network device D 105 when network device D 105 is unavailable to transmit, or possibly receive, that data. As illustrated, the network devices A-E 115A-C and 110 have transitioned into the low-power mode at period 130. This may be due to loss of mains power in these network devices or as a sympathetic response to the loss of mains power in the network device D 105. In an example, some network devices (e.g., network devices F and G 115D-E) do not transition into the low-power mode. In this example, these network devices can be configured to route around a low-power mode device for transmissions outside of the transmission window 123. In an example, every network device A-C and E-G 115A-E and 110 is configured to transition to low-power mode in response to receiving a message based on (e.g., informing the network device) of network device D's 105 transition to low-power mode. In an example, every network device A-C and E-G 115A-E and 110 is configured to observe low-power mode transmission requirements to the network device D 105 (e.g., observing the transmission window 123 with respect to network device D105) while not transitioning to the low-power mode themselves. In an example, the network is configured to transmit higher priority data during the transmission window 123. By restricting higher priority data to the transmission window 123, network performance of the higher priority data is not impacted when one or more network devices A-E 105, 110, 115A-E are operating in the low-power mode.

Figure 2:
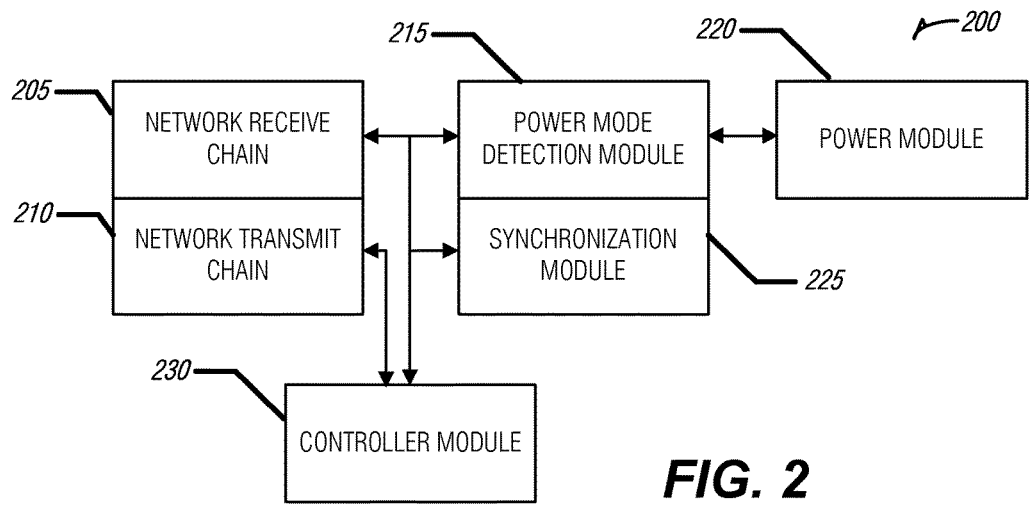
FIG. 2 illustrates an example of a network device in a synchronized network for battery backup, according to an embodiment.

FIG. 2 illustrates an example of a network device 200 in a synchronized network for battery backup. The network device 200 can include a network receive chain 205, a network transmit chain 210, a power mode detection module 215, a power module 220, a synchronization module 225, and a controller module 230. The network transmit chain 210 can be configured to transmit data to the network in which the network device 200 is participating. The network receive chain 205 can be configured to receive data from the network. The network transmit and receive chains 210 and 205 can include components such as modulators, encoders, decoders, antennas, mixers, and other signal processing components configured to transmit data. In an example, one or more of these components may be shared by the network receive chain 205 and the network transmit chain 210.

The power mode detection module 215 can be configured to determine whether the network device 200 is operating in a low-power mode or in a mains-power mode. In an example, the power mode detection module 215 can be communicatively coupled to the power module 220 and configured to monitor one or more indications that mains power is no longer available. In an example, the power mode detection module 215 can be configured to monitor the source voltage from the power module 220 for a transition across a predetermined source voltage threshold to determine the operating mode. In an example, the power module 220 can be configured to interface with both mains power and the battery reserve to provide power to the network device 200. In an example, the power mode detection module 215 can be communicatively coupled to the network receive chain 205 and be configured to monitor incoming data for at least one of a sleep, wake, or follow-the-synchronized-sleep-schedule-command. That is, the power mode detection module 215 can be triggered to start the transition from the mains-power mode to the low-power mode and back again by an external actor on the network. In an example, the power mode detection module 215 can be communicatively coupled to a physical interface on the network device 200, such as a button or serial line, to which a sleep or wake notification can be indicated. In this example, it is therefore possible for an operator to manually transition the network device 200 between the low-power and mains-power modes of operation.

In an example, the power mode detection module 215 can be configured to transition the network device 200 between at least the mains-power mode and the low-power mode based on its determination. In an example, the power mode detection module 215 can be configured to notify the network, such as a network coordinator or other network participant, of a transition between these power states. Such notification can be configured to include details of the transition and permit other network participants to plan accordingly. For example, when the network device 200 transitions into the low-power mode the entire network can also transition to the low-power or reduced communication (e.g., observing the transmission window 123) mode. In some instances, transitioning every network participant into the low-power mode can allow reduced power consumption without performance degradation. Also, the notification can alert a network device 200 that will not transition to low-power mode, but uses the network device 200 as a data destination or intermediary (e.g., router). In this example, the notification permits the second network device 200 to formulate a new route or destination for its data at least during periods outside of the transmission window 123.

The synchronization module 225 can be configured to receive (e.g., via the network receive chain 205 and store synchronization information. The synchronization information can include the synchronized sleep schedule 120 for the network. The synchronized sleep schedule 120 can include a transmission window 123. In an example, the synchronized sleep schedule 120 is shared with all participants of the network. This sharing entails the sharing of the transmission window 123 between the network device 200 and other network participants (e.g., network devices) of the network. For example, all network participants may send data during a single period of time that is the transmission window 123. In an example, the synchronization module 225 can be configured to accept synchronization messages via the network receive chain 205 to facilitate the establishment (e.g., receipt and storage) of the synchronized sleep schedule 120.

The controller module 230 can be communicatively coupled to any one or more of the network receive chain 205, the network transmit chain 210, the power mode detection module 215, and the synchronization module 225. The controller module 230 can be configured to transmit data via the network transmit chain 210 without regard to the transmission window 123 when the power mode detection module 215 determines that the network device 200 is operating in the mains-power mode. For example, when mains power is present, the controller module 230 is configured to operate in a high performance (e.g., high data throughput and low data latency) manner.

The controller module 230 can also be configured to restrict data transmission to the transmission window 123 of the synchronized sleep schedule 120 when the power mode detection module 215 determines that the network device 200 is operating in the low-power mode. For example, after loss of mains power, the controller module 230 prevents data transmissions during periods outside of the transmission window 123 to reduce power consumption. In an example, to restrict data transmission, the controller module 230 is configured to shutdown (e.g., power off) one or more components of its network receive chain 205. In an example, the controller module 230 can be configured to prevent data receipt by the network device 200 when outside of the transmission window 123 rendering the network device 200 incapable of receiving data outside of the transmission window 123. In an example, the controller module 230 can be configured to shutdown one or more components of the network receive chain 205 to prevent receipt of data outside of the transmission window 123. In these examples, powering off the transmit or receive components further reduces power consumption over merely keeping these components idle.

In an example, in response to transitioning back to the mains-power mode, the controller module 230 can be configured to again transmit data without regard to the transmission window 123. Thus, the controller module 230 controls the network device 200's power consumption during low-power operation by reducing some network performance and increases network performance when energy is less of a concern.

Figure 3:
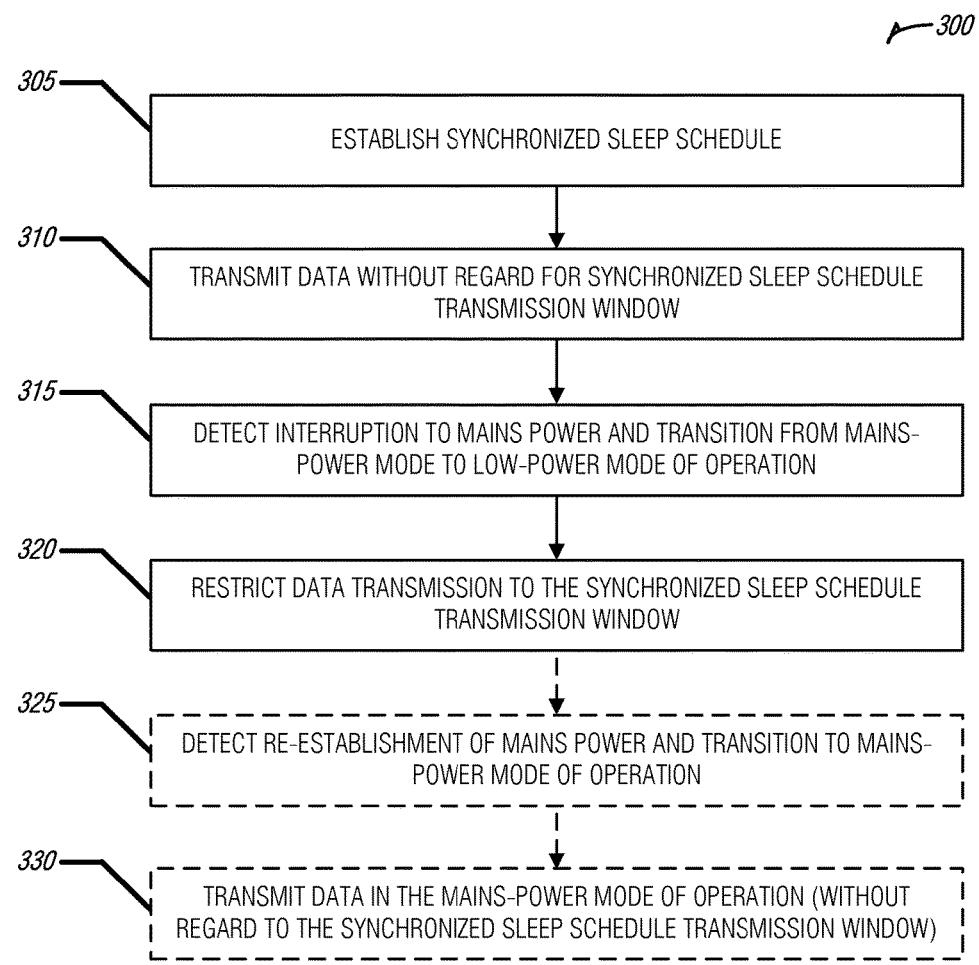
FIG. 3 illustrates an example of a method to implement a synchronized network for battery backup, according to an embodiment.

FIG. 3 illustrates an example of a method 300 for a network device 200 to implement a synchronized network for battery backup.

At operation 305 the network device 200 establishes a synchronized sleep schedule 120 while in a mains-power mode of operation. The synchronized sleep schedule 120 includes a transmission window 123. In an example, the synchronized sleep schedule 120 is shared with all participants of the network. That is, each network device 200 in the network receives the same synchronized sleep schedule 120 and adheres to the same transmission window 123 for sending data. In an example, the network device 200 receives synchronization messages 125 at regular intervals to establish the synchronized sleep schedule 120 with the network.

At operation 310 the network device 200 transmits data in the mains-power mode without regard for the transmission window 123.

At operation 315 the network device 200 detects an interruption of mains power and transitions to a low-power mode of operation. In an example, the network device 200 is incapable of receiving data when it is in the low-power mode. In an example, the network device 200 shuts down (e.g., powers off) one or more components of its network receive chain 205 (antennas, decoders, mixers, etc.). In an example, the network device 200 notifies at least one another network participant of its transition to the low-power mode.

At operation 320 the network device 200 transmits data in the low-power mode by restricting data transmission to the transmission window 123 (i.e., not transmitting data outside of the transmission window 123). In an example, the network device 200 restricts transmission by shutting down one or more components of its network transmit chain 210.

At operation 325 the network device 200 can optionally detect re-establishment of mains power and transition to the mains-power mode. In an example, the network device 200 notifies at least one other network participant of its transition to the mains-power mode.

At operation 330 the network device 200, in response to the transition of operation 325, will again transmit data in the mains-power mode without regard to the transmission window 123. That is, after mains power is restored, the network device 200 can resume the previous high-performance network operation.

Figure 4:
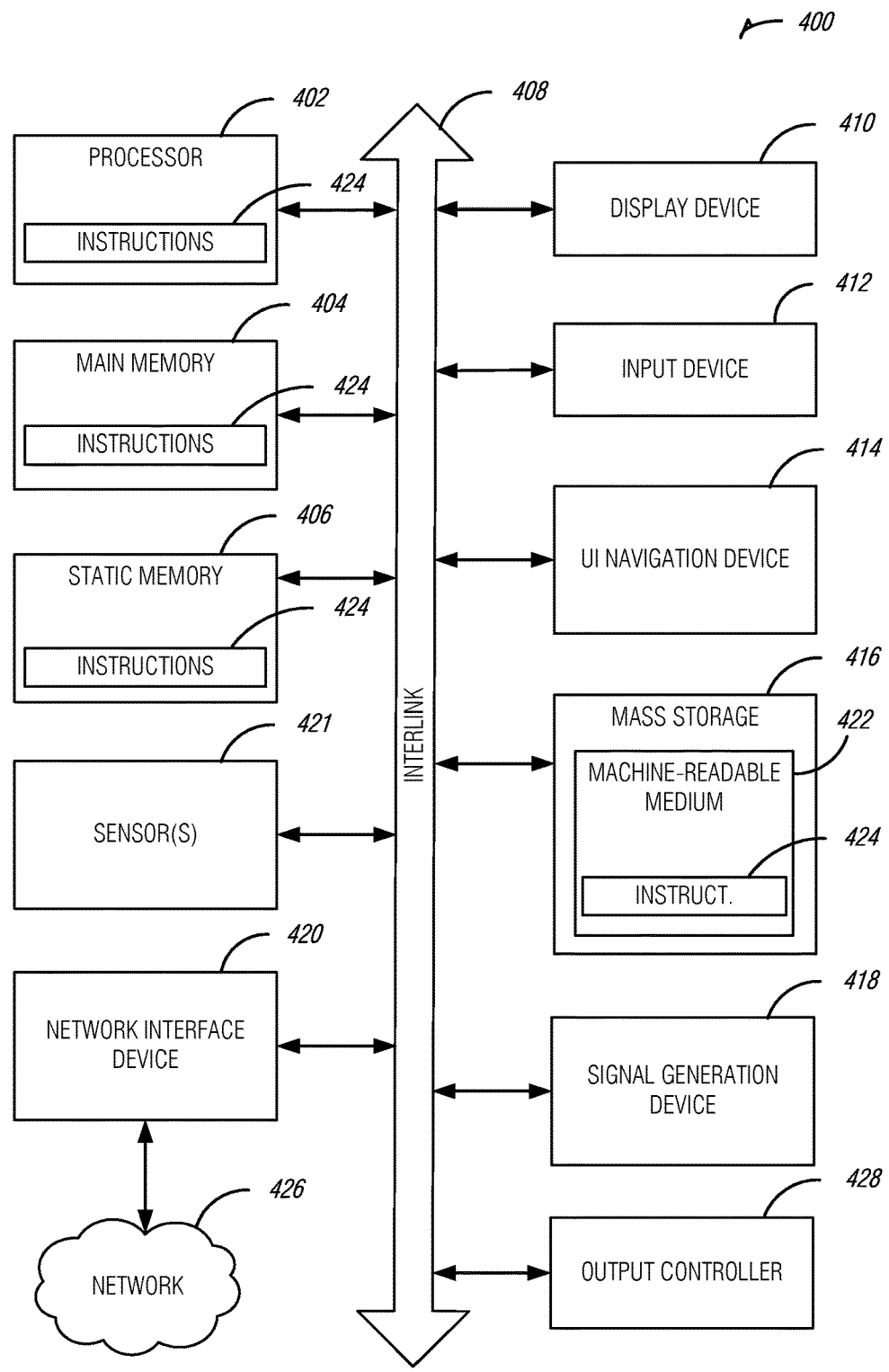
FIG. 4 is a block diagram illustrating an example of a machine upon which one or more embodiments may be implemented.

FIG. 4 illustrates a block diagram of an example machine 400 upon which any one or more of the techniques (e.g., methodologies) discussed herein may perform. In alternative embodiments, the machine 400 may operate as a standalone device or may be connected (e.g., networked) to other machines. In a networked deployment, the machine 400 may operate in the capacity of a server machine, a client machine, or both in server-client network environments. In an example, the machine 400 may act as a peer machine in peer-to-peer (P2P) (or other distributed) network environment. The machine 400 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The machine 400 may further include a display unit 410, an alphanumeric input device 412 (e.g., a keyboard), and a user interface (UI) navigation device 414 (e.g., a mouse). In an example, the display unit 410, input device 412 and UI navigation device 414 may be a touch screen display. The machine 400 may additionally include a storage device (e.g., drive unit) 416, a signal generation device 418 (e.g., a speaker), a network interface device 420, and one or more sensors 421, such as a global positioning system (GPS) sensor, compass, accelerometer, or other sensor. The machine 400 may include an output controller 428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 416 may include a machine readable medium 422 on which is stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the machine 400. In an example, one or any combination of the hardware processor 402, the main memory 404, the static memory 406, or the storage device 416 may constitute machine readable media.

While the machine readable medium 422 is illustrated as a single medium, the term "machine readable medium" may include a single medium or multiple media (e.g., a centralized or distributed database, and/or associated caches and servers) configured to store the one or more instructions 424.

The term "machine readable medium" may include any medium that is capable of storing, encoding, or carrying instructions for execution by the machine 400 and that cause the machine 400 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having resting mass. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 424 may further be transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 420 may include one or more physical jacks (e.g., Ethernet, coaxial, or phone jacks) or one or more antennas to connect to the communications network 426. In an example, the network interface device 420 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 400, and includes digital or analog communications signals or other intangible medium to facilitate communication of such software.

ADDITIONAL NOTES & EXAMPLES

Example 1 can include subject matter (such as a method, means for performing acts, or machine readable medium including instructions that, when performed by a machine cause the machine to performs acts) performed by a network device in a network comprising establishing a synchronized sleep schedule with the network, transmitting data in a mains-power mode of operation without regard for a transmission window of the synchronized sleep schedule, detecting an interruption of mains power to the network device and transitioning the network device to a low-power mode of operation, and transmitting data in the low-power mode, the low-power mode restricting data transmission to the transmission window of the synchronized sleep schedule.

In Example 2, the subject matter of Example 1 can optionally include wherein the low-power mode restricting data transmission to the transmission window of the synchronized sleep schedule includes shutting down a network transmit chain.

In Example 3, the subject matter of one or both of Examples 1 or 2 can optionally include the network device being incapable of receiving data when it is in low-power mode.

In Example 4, the subject matter of Example 3 can optionally include the network device shutting down a network receive chain in the low-power mode.

In Example 5, the subject matter of one or more of Examples 1-4 can optionally include wherein the synchronized sleep schedule is shared with all participants of the network.

In Example 6, the subject matter of one or more of Examples 1-5 can optionally include wherein transitioning the network device to the low-power mode of operation includes notifying another network participant of the transition.

In Example 7, the subject matter of one or more of Examples 1-6 can optionally include detecting re-establishment of mains power to the network device and transitioning the network device to the mains-power mode of operation, and transmitting data in the mains-power mode of operation.

In Example 8, the subject matter of Example 6 can optionally include wherein transitioning the network device to the mains-power mode of operation includes notifying another network participant of the transition to mains power.

In Example 9, the subject matter of one or more of Examples 1-8 can optionally include wherein establishing the synchronized sleep schedule with the network includes receiving synchronization messages at regular intervals.

Example 10 can include, or can optionally be combined with the subject matter of one or more of Examples 1-9 to include, subject matter (such as a method, means for performing acts, or machine readable medium including instructions that, when performed by a machine cause the machine to performs acts) comprising establishing a synchronized sleep schedule with a network, transmitting data in a mains-power mode of operation without regard for a transmission window of the synchronized sleep schedule, detecting an interruption of mains power to the network device and transitioning the network device to a low-power mode of operation, and transmitting data in the low-power mode, the low-power mode restricting data transmission to the transmission window of the synchronized sleep schedule.

In Example 11, the subject matter of Example 10 can optionally include wherein the low-power mode restricting data transmission to the transmission window of the synchronized sleep schedule includes shutting down a network transmit chain.

In Example 12, the subject matter of one or both of Examples 10 and 11 can optionally include wherein the network device is incapable of receiving data when it is in the low-power mode.

In Example 13, the subject matter of Example 12 can optionally include wherein the network device shuts down a network receive chain in the low-power mode.

In Example 14, the subject matter of one or more of Examples 10-13 can optionally include wherein the synchronized sleep schedule is shared with all participants of the network.

In Example 15, the subject matter of one or more of Examples 10-14 can optionally include wherein transitioning the network device to the low-power mode of operation includes notifying another network participant of the transition.

In Example 16, the subject matter of one or more of Examples 10-15 can optionally include (e.g., instructions causing the machine to perform operations comprising) detecting re-establishment of mains power to the network device and transitioning the network device to the mains-power mode of operation, and transmitting data in the mains-power mode of operation.

In Example 17, the subject matter of Example 16 can optionally include wherein transitioning the network device to the mains-power mode of operation includes notifying another network participant of the transition to mains power.

In Example 18, the subject matter of one or more of Examples 10-17 can optionally include wherein establishing the synchronized sleep schedule with the network includes receiving synchronization messages at regular intervals.

Example 19 can include, or can optionally be combined with the subject matter of one or more of Examples 1-18 to include, subject matter (such as a device, apparatus, or network device in a network) comprising a network transmit chain arranged to transmit data to the network, a network receive chain arranged to receive data from the network, a power mode detection module arranged to determine whether the network device is operating in at least one of a low-power mode or a mains-powered mode, a synchronization module configured to receive and store synchronization information via the network receive chain, the synchronization information including a synchronized sleep schedule for the network, and a controller module. The controller module can be arranged to transmit data via the network transmit chain without regard to a transmission window of the synchronized sleep schedule when the power mode detection module determines that the network device is operating in the mains-powered mode, and restrict data transmission via the network transmit chain to the transmission window when the power mode detection module determines that the network device is operating in the low-powered mode.

In Example 20, the subject matter of Example 19 can optionally include wherein to determine whether the network device is operating in at least one of the low-power mode or the mains-powered mode includes the power mode detection module arranged to monitor a source voltage of the network device for transitions over a predetermined source voltage threshold.

In Example 21, the subject matter of one or both of Examples 19 and 20 can optionally include wherein to determine whether the network device is operating in at least one of the low-power mode or the mains-powered mode includes the power mode detection module arranged to monitor a sleep request control line of the network device for the presence of a sleep assertion.

In Example 22, the subject matter of one or more of Examples 19-21 can optionally include wherein to determine whether the network device is operating in at least one of the low-power mode or the mains-powered mode includes the power mode detection module arranged to monitor data received from the network receive chain for at least one of a sleep or wake command.

In Example 23, the subject matter of one or more of Examples 19-22 can optionally include wherein the synchronized sleep schedule is shared with all participants of the network.

In Example 24, the subject matter of one or more of Examples 19-23 can optionally include wherein to restrict data transmission via the network transmit chain to the transmission window the controller module is configured to shutdown the network transmit chain.

Example 25 can include, or can optionally be combined with the subject matter of one or more of Examples 1-24 to include, subject matter (such as a system or network) comprising a synchronized sleep schedule, a first network device and a second network device. The first network device can be in low-power mode and arranged to maintain, within the first network device, the synchronized sleep schedule without regard to a current power mode of the first network device, the synchronized sleep schedule including a transmission window, and restrict data transmission, to the network, to the transmission window. The second network device can be arranged to transmit data to the first network device.

In Example 26, the subject matter of Example 25 can optionally include wherein the first network device is arranged to notify the network when transitioning into the low-power mode, and the second network device is arranged to transition into the lower-power mode in response to a message based on the notification from the first network device.

In Example 27, the subject matter of Example 26 can optionally include wherein every network device in the network is arranged to transition into the low-power mode in response to the message.

In Example 28, the subject matter of one or more of Examples 25-27 can optionally include wherein the network is a mesh network.

In Example 29, the subject matter of one or more of Examples 25-28 can optionally include wherein the first network device is a mesh router of the second network device, the second network device is in a mains-power mode, and the second network device is arranged to cease using the first network device as the wireless mesh router in response to a determination that the first network device is in a low-power mode.

In Example 30, the subject matter of one or more of Examples 25-29 can optionally include wherein the network is a synchronized sleep network arranged to communicate the synchronized sleep schedule to every network device in the network, the synchronized sleep schedule including a single set of transmission windows for every network device, the transmission window being a member of the set of transmission windows.

In Example 31, the subject matter of one or both of Examples 29 and 30 can optionally include wherein the network is arranged to transmit higher priority data during a transmission window in the set of transmission windows.

The above detailed description includes references to the accompanying drawings, which form a part of the detailed description. The drawings show, by way of illustration, specific embodiments in that may be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A method performed by a network device in a network, the method comprising:
   establishing a synchronized sleep schedule with the network, wherein the synchronized sleep schedule includes alternating periods of a transmission window and periods outside the transmission window;
   transmitting data during the transmission window and periods outside the transmission window of the synchronized sleep schedule when in a mains-power mode of operation;
   detecting an interruption of mains power to the network device;
   in response to detecting the interruption of mains power to the network device, transitioning the network device to a low-power mode of operation; and
   transmitting data only during the transmission window of the synchronized sleep schedule when in the low-power mode, wherein the network device is configured to transmit and receive data with every other network device during the transmission window when in the low-power mode.

2. The method of claim 1, further comprising shutting down a network transmit chain of the network device during the periods outside the transmission window when in the low-power mode.

3. The method of claim 1, wherein the synchronized sleep schedule is shared with all participants of the network.

4. The method of claim 1, wherein transitioning the network device to the low-power mode of operation includes notifying another network participant of the transition.

5. The method of claim 1, comprising:
   detecting re-establishment of mains power to the network device;
   in response to detecting the re-establishment of mains power to the network device, transitioning the network device to the mains-power mode of operation; and
   transmitting data in the mains-power mode of operation.

6. The method of claim 5, wherein transitioning the network device to the mains-power mode of operation includes notifying another network participant of the transition to mains power.

7. The method of claim 1, wherein establishing the synchronized sleep schedule with the network includes receiving synchronization messages at regular intervals.

8. The method of claim 1, further comprising shutting down a network receive chain of the network device during the periods outside the transmission window when in the low-power mode.

9. A non-transitory machine readable medium including instructions that, when executed by a component of a machine, cause a network device to perform operations comprising:
   establishing a synchronized sleep schedule with a network, wherein the synchronized sleep schedule includes alternating periods of a transmission window and periods outside the transmission window;
   transmitting data during the transmission window and periods outside the transmission window of the synchronized sleep schedule when in a mains-power mode of operation;
   detecting an interruption of mains power to the network device,
   in response to detecting the interruption of mains power to the network device, transitioning the network device to a low-power mode of operation; and
   transmitting data only during the transmission window of the synchronized sleep schedule when in the low-power mode, wherein the network device is configured to transmit and receive data with every other network device during the transmission window when in the low-power mode.

10. The non-transitory machine readable medium of claim 9, including instructions causing the network device to perform operations comprising shutting down a network transmit chain of the network device during the periods outside the transmission window when in the low-power mode.

11. The non-transitory machine readable medium of claim 9, wherein the synchronized sleep schedule is shared with all participants of the network.

12. The non-transitory machine readable medium of claim 9, wherein transitioning the network device to the low-power mode of operation includes notifying another network participant of the transition.

13. The non-transitory machine readable medium of claim 9, including instructions causing the network device to perform operations comprising:
   detecting re-establishment of mains power to the network device;
   in response to detecting the re-establishment of mains power to the network device, transitioning the network device to the mains-power mode of operation; and
   transmitting data in the mains-power mode of operation.

14. The non-transitory machine readable medium of claim 13, wherein transitioning the network device to the mains-power mode of operation includes notifying another network participant of the transition to mains power.

15. The non-transitory machine readable medium of claim 9, wherein establishing the synchronized sleep schedule with the network includes receiving synchronization messages at regular intervals.

16. The non-transitory machine readable medium of claim 9, including instructions causing the network device to perform operations comprising shutting down a network receive chain of the network device during the periods outside the transmission window when in the low-power mode.

17. A network device in a network, the network device comprising:
   a network transmitter to transmit data to the network;
   a network receiver to receive data from the network;
   wherein the network device is configured to determine whether the network device is operating in at least one of a low-power mode or a mains-powered mode; and
   wherein the network device is configured to receive and store synchronization information via the network receiver, the synchronization information including a synchronized sleep schedule for the network, wherein the synchronized sleep schedule includes alternating periods of a transmission window and periods outside the transmission window; and
   a controller configured to:
      transmit data via the network transmitter during the transmission window and periods outside the transmission window of the synchronized sleep schedule when the network device is operating in the mains-powered mode;
      transmit data via the network transmitter only during the transmission window of the synchronized sleep schedule when the network device is operating in the low-powered mode; and
   wherein the network transmitter and the network receiver are configured to transmit and receive data with every other network device during the transmission window of the synchronized sleep schedule when the network device is in the low-powered mode.

18. The network device of claim 17, wherein the network device is configured to determine whether the network device is operating in at least one of the low-power mode or the mains-powered mode by monitoring a source voltage of the network device for transitions over a predetermined source voltage threshold.

19. The network device of claim 17, wherein the network device is configured to determine whether the network device is operating in at least one of the low-power mode or the mains-powered mode by monitoring a sleep request control line of the network device for the presence of a sleep assertion.

20. The network device of claim 17, wherein the network device is configured to determine whether the network device is operating in at least one of the low-power mode or the mains-powered mode by monitoring data received from the network receive chain for at least one of a sleep or wake command.

21. The network device of claim 17, wherein the synchronized sleep schedule is shared with all participants of the network.

22. The network device of claim 17, wherein the controller is configured to shut down the network transmitter of the network device during the periods outside the transmission window when in the low-power mode.

23. The network device of claim 17, wherein the controller is configured to shut down the network receiver of the network device during the periods outside the transmission window when in the low-power mode.

24. A system comprising a network including:
    a first network device configured to:
        maintain, within the first network device, a synchronized sleep schedule for the network without regard to a current power mode of the first network device, the synchronized sleep schedule including alternating periods of a transmission window and periods outside the transmission window;
        detect an interruption of mains power to the first network device;
        in response to detecting the interruption of mains power to the network device, transition the first network device to a low-power mode; and
        while in the low-power mode, transmit data, to the network, only during the transmission window of the synchronized sleep schedule, wherein the first network device is configured for data transmission and reception with every other network device during the transmission window when in the low-power mode; and
    a second network device configured to transmit data to the first network device.

25. The system of claim 24, wherein the first network device is configured to notify the network when transitioning into the low-power mode; and
    the second network device is configured to transition into the lower-power mode in response to a message based on the notification from the first network device.

26. The system of claim 25, wherein every network device in the network is configured to transition into the low-power mode in response to the message.

27. The system of claim 24, wherein the network is a mesh network.

28. The system of claim 24, wherein the first network device is a mesh router of the second network device, the second network device is in a mains-power mode, and the second network device is configured to cease using the first network device as the wireless mesh router in response to a determination that the first network device is in a low-power mode.

29. The system of claim 24, wherein the network is a synchronized sleep network configured to communicate the synchronized sleep schedule to every network device in the network, the synchronized sleep schedule including a single set of transmission windows for every network device, the transmission window being a member of the set of transmission windows.

30. The system of claim 29, wherein the network is configured to transmit higher priority data during a transmission window in the set of transmission windows.

31. The system of claim 24, wherein the first network device configured to shut down a network transmitter and a network receiver of the first network device during the periods outside the transmission window when in the low-power mode.

* * * * *